United States Patent
Kang et al.

(10) Patent No.: US 11,829,434 B2
(45) Date of Patent: Nov. 28, 2023

(54) METHOD, APPARATUS AND COMPUTER PROGRAM FOR COLLECTING URL IN WEB PAGE

(71) Applicant: NAVER CLOUD CORPORATION, Seongnam-si (KR)

(72) Inventors: Bong Goo Kang, Seongnam-si (KR); Min Seob Lee, Seongnam-si (KR); Won Tae Jang, Seongnam-si (KR); June Ahn, Seongnam-si (KR); Jihwan Yoon, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 0 days.

(21) Appl. No.: 16/828,055

(22) Filed: Mar. 24, 2020

(65) Prior Publication Data
US 2020/0311170 A1 Oct. 1, 2020

(30) Foreign Application Priority Data

Mar. 28, 2019 (KR) .......................... 10-2019-0036359

(51) Int. Cl.
*G06F 16/95* (2019.01)
*G06F 16/955* (2019.01)
*G06F 16/951* (2019.01)
*G06F 16/958* (2019.01)

(52) U.S. Cl.
CPC ........ *G06F 16/9566* (2019.01); *G06F 16/951* (2019.01); *G06F 16/986* (2019.01)

(58) Field of Classification Search
CPC .................................................. G06F 16/9566
USPC ........................................................ 707/713
See application file for complete search history.

(56) References Cited

U.S. PATENT DOCUMENTS

| | | | | |
|---|---|---|---|---|
| 6,751,736 B1* | 6/2004 | Bowman | ............... | G06F 21/606 |
| | | | | 713/176 |
| 9,639,629 B1* | 5/2017 | Venkat | ................ | G06F 16/9574 |
| 2007/0211080 A1* | 9/2007 | Adams | .................... | G06F 16/50 |
| | | | | 345/619 |
| 2007/0282819 A1* | 12/2007 | Lynn | .................. | H04N 21/8586 |
| 2010/0205241 A1* | 8/2010 | Lin | .................. | H04N 21/47805 |
| | | | | 709/203 |
| 2014/0373032 A1* | 12/2014 | Merry | ........................ | G06F 9/54 |
| | | | | 719/328 |
| 2015/0067839 A1* | 3/2015 | Wardman | ............... | G06Q 10/10 |
| | | | | 726/22 |
| 2016/0217503 A1* | 7/2016 | Mihlály | ................ | G06Q 30/02 |

(Continued)

FOREIGN PATENT DOCUMENTS

| | | |
|---|---|---|
| KR | 100571302 A | 4/2006 |
| KR | 1020150133370 A | 11/2015 |

OTHER PUBLICATIONS

Office action from corresponding Korean patent application dated Jul. 20, 2020.

*Primary Examiner* — Syling Yen
(74) *Attorney, Agent, or Firm* — GREER BURNS & CRAIN, LTD.

(57) ABSTRACT

A URL collecting method includes accessing, by a URL collecting apparatus, a web server of a first URL; receiving, by the URL collecting apparatus, a first web page from the web server; and a URL dynamic collecting step of collecting, by the URL collecting apparatus, one or more URLs invoked while performing some or all of source codes of the first web page.

10 Claims, 8 Drawing Sheets

(56) References Cited

U.S. PATENT DOCUMENTS

2017/0177727 A1\* 6/2017 Scoda .................. G06F 16/951
2017/0236078 A1\* 8/2017 Rasumov ............ G06F 21/6218
705/7.28

\* cited by examiner

FIG. 4A

```
<a href="http://www.user.com/abc"> REPRESENTATION TEXT </a>
   320         330
310
```

FIG. 4B

```
 340  350        360
<form action="http://www.user.com" method="POST">
<input name="parameter" type="text">
<input type=submit>  370
</form>
```

FIG. 6A

```
<input type="button" value="BUTTON" onclick="alert{'hello world'}">
                                    ‾‾‾‾‾‾‾
                                      610
```

FIG. 6B

```
<input type="text" onkeypress="zzz()">
                   ‾‾‾‾‾‾‾‾‾‾
                       620
<script>
function zzz() {
   alert("TEXT BEING INPUT");
}
</script>
```

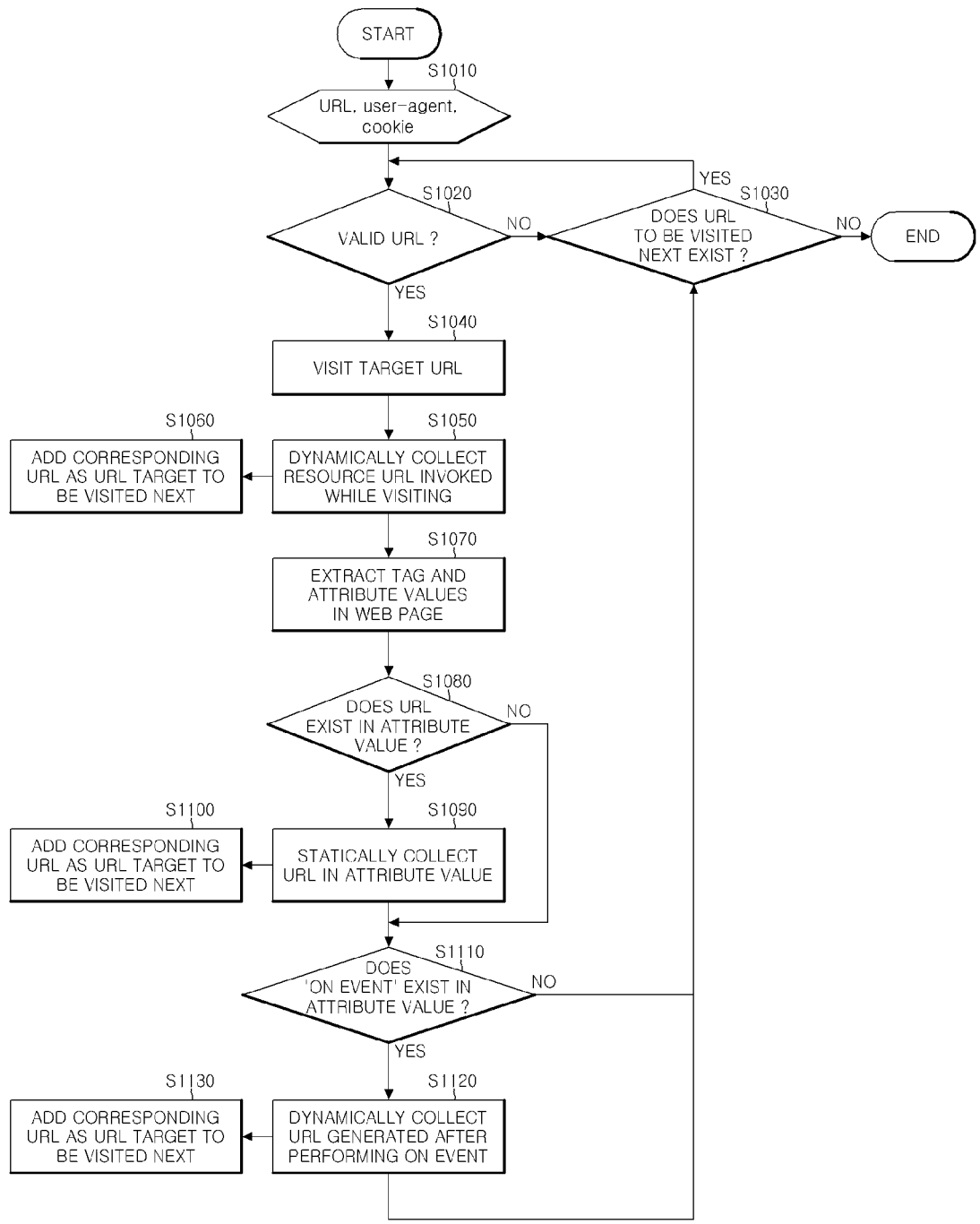

METHOD, APPARATUS AND COMPUTER PROGRAM FOR COLLECTING URL IN WEB PAGE

CROSS-REFERENCE TO RELATED APPLICATIONS

This application claims priority to Korean Patent Application No. 10-2019-0036359 filed on Mar. 28, 2019 in Korean Intellectual Property Office, the entire content of which is hereby incorporated by reference in its entirety.

BACKGROUND OF THE INVENTION

Field of Invention

The present invention relates to a method, an apparatus and a computer program for collecting a URL in a web page, and more particularly, to a method, an apparatus and a computer program, which are capable of more effectively collecting a URL from a web page by collecting a called URL while performing a source code of the web page in addition to collecting a URL exposed to the source code by parsing the source code of the web page.

Description of Related Art

With the development of information and communication technologies, users can obtain information desired thereby anywhere at any time by using various terminals such as a personal computer (PC) or a smart phone. For example, a user can access a portal site, etc., by using various wired/wireless terminals to conveniently receive various information including weather, dictionaries, concerts, travels, movies, and the like. As a result, there is a need that a document such as the web page should be searched and information should be collected and updated in order to provide various information to the user in a portal site, etc.

A process of collecting and analyzing web pages in order to collect the information to be provided to the user is referred to as web crawling. In web crawling, various information is analyzed and collected while sequentially visiting uniform resource locators (URLs) included in the web page.

However, when the URL is collected from a web page for various purposes including web crawling, and the like, the URL exposed to the source code is generally collected by analyzing (i.e., parsing) the source code of the web page in the related art (i.e., static collection).

However, when the URL is statically collected from a web page, various problems may occur. More specifically, when a URL is statically collected, a URL invoked by a script performed in the web page is not determined, and as a result, the URL may be omitted, or a problem in that an invalid URL is also included in URLs collected just using parsing may also occur.

BRIEF SUMMARY OF THE INVENTION

The present invention is contrived to solve the problem in the related art and has been made in an effort to provide a method, an apparatus and a computer program for collecting a URL, which can effectively solve a problem of a URL being omitted while a source code of a web page is performed or an invalid URL being collected in collecting URLs in a web page.

The present invention has also been made in an effort to provide a method, an apparatus and a computer program for collecting a URL capable of automatically classifying searched images for each category through analysis of the searched images.

An exemplary embodiment of the present invention provides a URL collecting method which includes: accessing, by a URL collecting apparatus, a web server of a first URL; receiving, by the URL collecting apparatus, a first web page from the web server; and a URL dynamic collecting step of collecting, by the URL collecting apparatus, one or more URLs invoked while performing some or all of source codes of the first web page.

Another exemplary embodiment of the present invention provides a computer program for executing each step of the disclosed URL collecting method in combination with hardware.

Still another exemplary embodiment of the present invention provides a URL collecting apparatus which includes: a web server access unit accessing a web server of a first URL; a web page transmission unit receiving a first web page from the web server; and a URL dynamic collection unit collecting one or more URLs invoked while performing some or all of source codes of the first web page.

According to an exemplary embodiment of the present invention, in a method, an apparatus and a computer program for collecting a URL, even an invoked URL is collected while performing a source code of a web page in addition to collecting a URL exposed to the source code by parsing the source code of the web page to more effectively collect the URL from the web page.

BRIEF DESCRIPTION OF THE DRAWINGS

In order to help understanding of the present invention, the accompanying drawings which are included as a part of the Detailed Description provide embodiments of the present invention and describe the technical spirit of the present invention together with the Detailed Description.

FIGS. 4A and 4B are diagrams for describing a case of collecting a URL from a tag of a source code according to an exemplary embodiment of the present invention.

FIGS. 6A and 6B are diagrams for describing a case of collecting a URL from an attribute of a source code according to an exemplary embodiment of the present invention.

FIG. 7 is a detailed flowchart of a URL collecting method according to an exemplary embodiment of the present invention.

DETAILED DESCRIPTION OF THE INVENTION

The present invention may have various modifications and various embodiments and hereinafter, specific embodiments will be described in detail based on the accompanying drawings.

In describing the present invention, a detailed description of related known technologies will be omitted if it is determined that they make the gist of the present invention unclear.

Terms such as first, second, and the like are used for describing various constituent elements, but the constituent elements are not limited by the terms, and the terms are used only for distinguishing one constituent element from other constituent elements.

Hereinafter, exemplary embodiments of a method, an apparatus and a computer program for collecting a URL according to the present invention will be described in detail with reference to the accompanying drawings.

Figure 1:
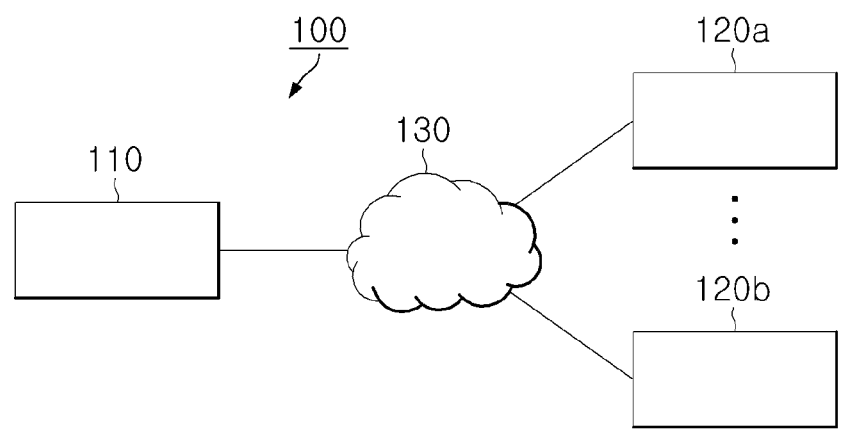
FIG. 1 is a configuration diagram of a URL collecting system according to an exemplary embodiment of the present invention.

First, FIG. 1 is a configuration diagram of a URL collecting system 100 according to an exemplary embodiment of the present invention. As illustrated in FIG. 1, the URL collecting system 100 according to an exemplary embodiment of the present invention may be configured to include one or more web servers 120a, 120, collectively referred to as a web server 120, providing a web service to network apparatus or terminals (not shown) connected through a communication network 130, and a URL collecting apparatus 110 collecting one or more URLs by analyzing a web page by accessing the web server 120 through the communication network 130.

The URL collecting apparatus 110 may be implemented using a server, in the form of a computer program or a computer, but the present invention is not particularly limited thereto and may be implemented as various types such as a separate apparatus for URL collection or furthermore, applications driven in a wired/wireless terminal such as a portable terminal such as a smartphone, a tablet PC, a PDA, a cellular phone, etc., or a personal computer (PC), etc.

The web server 120 may also be implemented using the server, but the present invention is not particularly limited thereto and may be implemented as a separate apparatus for providing the web service or applications driven in a wired/wireless terminal such as the portable terminal such as the smartphone, the tablet PC, the PDA, the cellular phone, etc., or the personal computer (PC), etc.

The communication network 130 connecting the URL collecting apparatus 110 and the web server 120 may include a wired network and a wireless network and in detail, may include various networks including a local area network (LAN), a metropolitan area network (MAN), a wide area network (WAN), and the like. Further, the communication network 130 may include known world wide web (WWW). However, the communication network 130 according to the present invention is not limited to the enumerated networks and may include at least some of a known wireless data network, a known telephone network, and a known wired/wireless television network.

Figure 2:
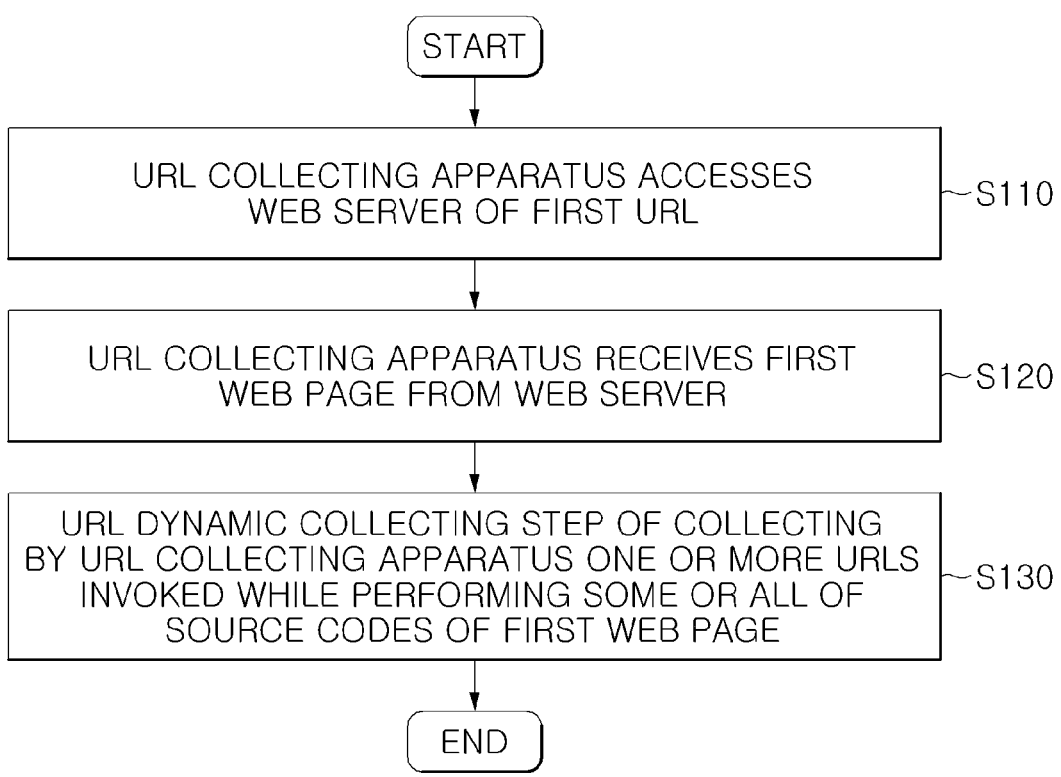
FIG. 2 is a flowchart of a URL collecting method according to an exemplary embodiment of the present invention.

FIG. 2 is a flowchart of a URL collecting method according to an exemplary embodiment of the present invention. As illustrated in FIG. 2, the URL collecting method according to an exemplary embodiment of the present invention may include a step (S110) in which a URL collecting apparatus 110 accesses a web server 120 of a first URL, a step (S120) in which the URL collecting apparatus 110 receives a first web page from the web server 120, and a URL dynamic collecting step (S130) in which the URL collecting apparatus 110 collects one or more URLs invoked while performing some or all of source codes of the first web page.

Hereinafter, the URL collecting method according to an exemplary embodiment of the present invention will be examined in detail separately for each step with reference to FIG. 2.

First, in step S110, the URL collecting apparatus 110 accesses the web server 120 of the first URL.

In this case, the URL collecting apparatus 110 may collect a URL by accessing a web server 120a using a predetermined first URL (e.g., seed URL) or access another web server 120b using the first URL collected in the web page of the web server 120a which was previously accessed.

In the URL collecting method according to an exemplary embodiment of the present invention, the URL collecting apparatus 110 may verify whether the first URL is a valid URL which is allowed to be accessed before accessing the web server 120.

More specifically, the URL collecting apparatus 110 may be allowed to access the web server 120 of the first URL after verifying whether the first URL is a valid URL which is allowed to be accessed by checking whether the web server 120 of the first URL is a computing resource of an owner of the URL collecting apparatus 110, whether the web server of the first URL is in a normally operable state, etc.

Next, in step S120, the URL collecting apparatus 110 receives the first web page from the web server 120.

As a result, the URL collecting apparatus 110 may collect the URL using the first web page transmitted from the web server 120.

Next, in step S130 (URL dynamic collecting step), the URL collecting apparatus 110 collects one or more URLs which are invoked (or processed) while performing some or all of source codes of the first web page (i.e., dynamic collection).

As a result, in the URL collecting method according to an exemplary embodiment of the present invention, the problem in which a URL is omitted when the URL is collected (i.e., statically collected) by parsing the source code of the web page or when a URL is not determined while performing the source code of the web page, is solved.

More specifically, the URL dynamic collecting step (S130) may include a resource URL collecting step in which the URL collecting apparatus 110 collects URLs of resources invoked while rendering (i.e., composing) the first web page.

In other words, when the URL collecting apparatus 110 visits the web server 120, URLs of required resources are invoked while rendering the first web page and, in this case, when the URL collecting apparatus 110 visits the web server 120, URLs of various resources including an image, a font, an audio, and the like are invoked in order to render the first web page, and as a result, the URL collecting apparatus 110 may dynamically collect the URLs of the resources in the URL dynamic collecting step (S130).

Figure 3:
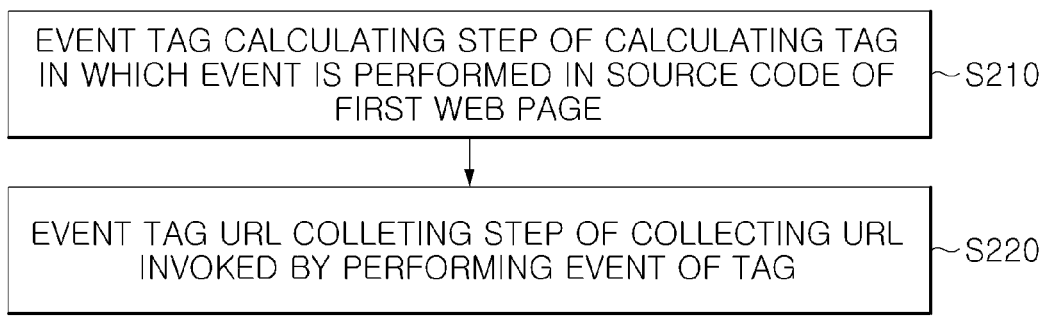
FIG. 3 is a flowchart of a case of collecting a URL from a tag of a source code according to an exemplary embodiment of the present invention.

As illustrated in FIG. 3, the URL dynamic collecting step (S130) may include an event tag calculating step (S210) of calculating a tag in which an event is performed in the source code of the first web page and an event tag URL collecting step (S220) of collecting the URL invoked by performing the event of the tag.

To this end, the URL collecting apparatus 110 may extract some or all of tags included in the source code of the first web page.

In particular, in the URL collecting method according to an exemplary embodiment of the present invention, when an <A> tag exists in the source code of the first web page, the URL collecting apparatus 110 may collect a URL invoked by incurring a click event of the <A> tag.

More specifically, FIG. 4A illustrates the <A> tag providing a link. In FIG. 4A, an <A> tag 310 includes a href attribute 320 and provides a link 330 for "http://www.user.com/abc". As such, the URL collecting apparatus 110 dynamically collects the URL invoked while incurring the click event for the link 330 of "http://www.user.com/abc".

The URL collecting method according to an exemplary embodiment of the present invention may further include a FORM tag URL collecting step of collecting, when a <FORM> tag exists in the source code of the first web page, parameter information together with a URL included in an "action" attribute of the <FORM> tag.

More specifically, FIG. 4B illustrates a <FORM> tag transmitting given data. and in this case, FIG. 4B illustrates a case where a <FORM> tag 340 includes an action attribute 350 and data including a parameter 370 is transmitted to "http://www.user.com" 360. In this case, in the present invention, the URL collecting apparatus 110 collects the parameter 370 together with the collecting of the URL of the "http://www.user.com/abc" 360 in the case of the <FORM> tag (i.e., static collection).

Figure 5:
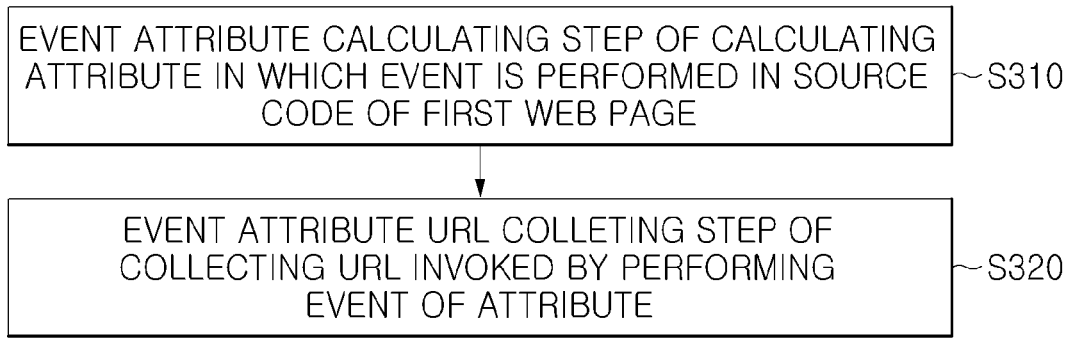
FIG. 5 is a flowchart of a case of collecting a URL from an attribute of a source code according to an exemplary embodiment of the present invention.

As illustrated in FIG. 5, the URL dynamic collecting step (S130) may include an event attribute calculating step (S310) of calculating an attribute in which an event is performed in the source code of the first web page and an event attribute URL collecting step (S320) of collecting the URL invoked by performing the event of the attribute.

To this end, the URL collecting apparatus 110 may extract some or all of attributes included in the source code of the first web page.

In particular, in the URL collecting method according to an exemplary embodiment of the present invention, when an "on event" exists in the source code of the first web page, the URL collecting apparatus 110 may collect a URL invoked by incurring the "on event."

Here, the "on event" as an event in which a name starts with "on-" in an attribute of Hyper Text Markup Language (HTML) is referred to as an event in which a script is executed by occurrence of the event (e.g., onclick, ondblclick, onkeypress, etc.).

More specifically, FIG. 6A illustrates an "onclick" event 610 in which the script is executed when the URL is clicked. In FIG. 6A, the "onclick" event 610 performs a script (alert{'hello world'}). As such, the URL collecting apparatus 110 dynamically collects the URL invoked while performing the script by incurring the "onclick" event 610.

FIG. 6B illustrates an "onkeypress" event 620 in which the script is executed when a key is pressed. In FIG. 6B, the URL collecting apparatus 110 dynamically collects the URL invoked while performing the script by incurring the "onkeypress" event 620.

The URL collecting apparatus 110 may perform all of the source codes of the first web page, but collect a URL invoked while selecting and performing some codes to invoke the URL among the source codes.

The URL collecting apparatus 110 may perform the source code of the web page and actually render the resulting web page or provide the resulting web page to a user, but collect only the URL invoked without actually rendering the web page while performing the source code of the web page.

The URL collecting apparatus 110 may perform the source code of the first web page and interrupt some or all of data to be transmitted to the web server 120 by performing the source code.

More specifically, when the data transmitted to the web server 120 by performing the source code is data which may incur interference to collection of the URL for the first web page, the URL collecting apparatus 110 may interrupt the data.

For example, when the URL collecting apparatus 110 collects the URL while performing the script, the URL collecting apparatus 110 performs a logout request and when the URL collecting apparatus 110 actually transmits the resulting data to the web server 120, the URL collecting apparatus 110 is logged out from the web server 120 which may cause interference to collecting the URL for the first web page, and as a result, the URL collecting apparatus 110 interrupts the data to more efficiently collect the URL.

The URL collecting apparatus 110 may dynamically collect the URL by calculating and analyzing the data transmitted to the web server 120 by performing the source code of the first web page and furthermore, use the data transmitted from the web server 120 for dynamically collecting the URL.

In the URL collecting method according to an exemplary embodiment of the present invention, the URL collecting apparatus 110 may collect the URL invoked while the script of the source code is executed. More specifically, the URL collecting apparatus 110 may dynamically collect URLs invoked by scripts including Javascript, Asynchronous Javascript And XML (AJAX), etc.

The URL collecting method according to an exemplary embodiment of the present invention may further include a URL static collecting step in which the URL collecting apparatus 110 collects one or more URLs exposed to the source code by analyzing the source code of the first web page, and a duplicated URL removing step of removing a duplicated URL by comparing the URL collected in the URL dynamic collecting step and the URL collected in the URL static collecting step.

FIG. 7 is a more detailed flowchart of a URL collecting method according to an exemplary embodiment of the present invention. Hereinafter, the URL collecting method according to an exemplary embodiment of the present invention will be examined in more detail with reference to FIG. 7.

First, in step S1010, a first URL is prepared. The first URL may be a given seed URL or a URL collected in the web page of the web server 120 previously accessed. Further, in step S1010, a user environment of the URL collecting apparatus 110 may be set. As a result, user-agent may be set considering the type, and the use environment of a web browser or cookie may be set in order to set login information such as administrator setting.

Next, in step S1020, it is verified whether the first URL is a valid URL which is allowed to be accessed. More specifically, the URL collecting apparatus 110 verifies whether the first URL is a valid URL, which is allowed to be accessed by checking whether the web server 120 of the first URL is a computing resource of an owner of the URL collecting apparatus 110, whether the web server 120 of the first URL is in an normally operable state, etc.

When the first URL is not valid and there is no other URL to be visited (S1030), URL collection ends.

In step S1040, the web server 120 of the first URL is visited.

Next, in step S1050, the URL collecting apparatus 110 collects URLs of invoked resources while rendering a first web page of the web server 120. In this case, the collected URLs are added to URLs to be visited next (S1060).

In step S1070, tags and attribute values included in the first web page are extracted.

In this case, the <FORM> tag and the <A> tag may be included in the extracted tag list.

The extracted attribute list includes cite, href, data-path, xmins, and itemtype to extract the URL. Here, since URLs which may be obtained in src, data-src, and srcset attributes are collected in step S1050, step S1070 may be excluded.

Next, in step S1080, it is determined whether a URL exists in the extracted attribute value.

As a result, when a URL exists in the extracted attribute value, the URL included in the extracted attribute value is statically collected (S1090). In this case, the collected URLs are added to URLs to be visited next (S1100).

The URL which exists in the extracted tag may also be collected.

When the <A> tag exists in the extracted tag, the URL invoked by incurring by the click event may be dynamically collected.

When the <FORM> tag exists in the extracted tag, the parameter may also be collected in addition to the URL.

Next, in step S1110, it is determined whether an "on event" exists in the source code of the first web page.

As a result, in step S1120, when an "on event" exists in the source code of the first web page, the URL invoked by incurring the "on event" is dynamically collected. In this case, the collected URLs are also added to URLs to be visited next (S1130).

The URL collecting apparatus 110 collects the URL from the web page while recursively visiting the URLs collected through the series of steps.

It is characterized in that a computer program according to another aspect of the present invention is a computer program for executing each step of the URL collecting method described above in combination with hardware. The computer program may be a computer program including a machine language code created by a compiler and a computer program including a high-level language code which may be executed in a computer using an interpreter. In this case, the computer is not limited to a personal computer (PC) or a notebook computer and includes all information processing apparatuses which include a central processing unit (CPU) to execute the computer program, such as a server, a smartphone, a tablet PC, a PDA, a cellular phone, etc. Further, the computer program may be stored in a computer readable medium and the medium includes all computer readable storage media such as an electronic recording medium (e.g., ROM, flash memory, etc.), a magnetic storage medium (e.g., a floppy disk, a hard disk, etc.), an optical reading medium (e.g., CD-ROM, DVD, etc.), and a carrier wave (e.g., transmission through the Internet).

Figure 8:
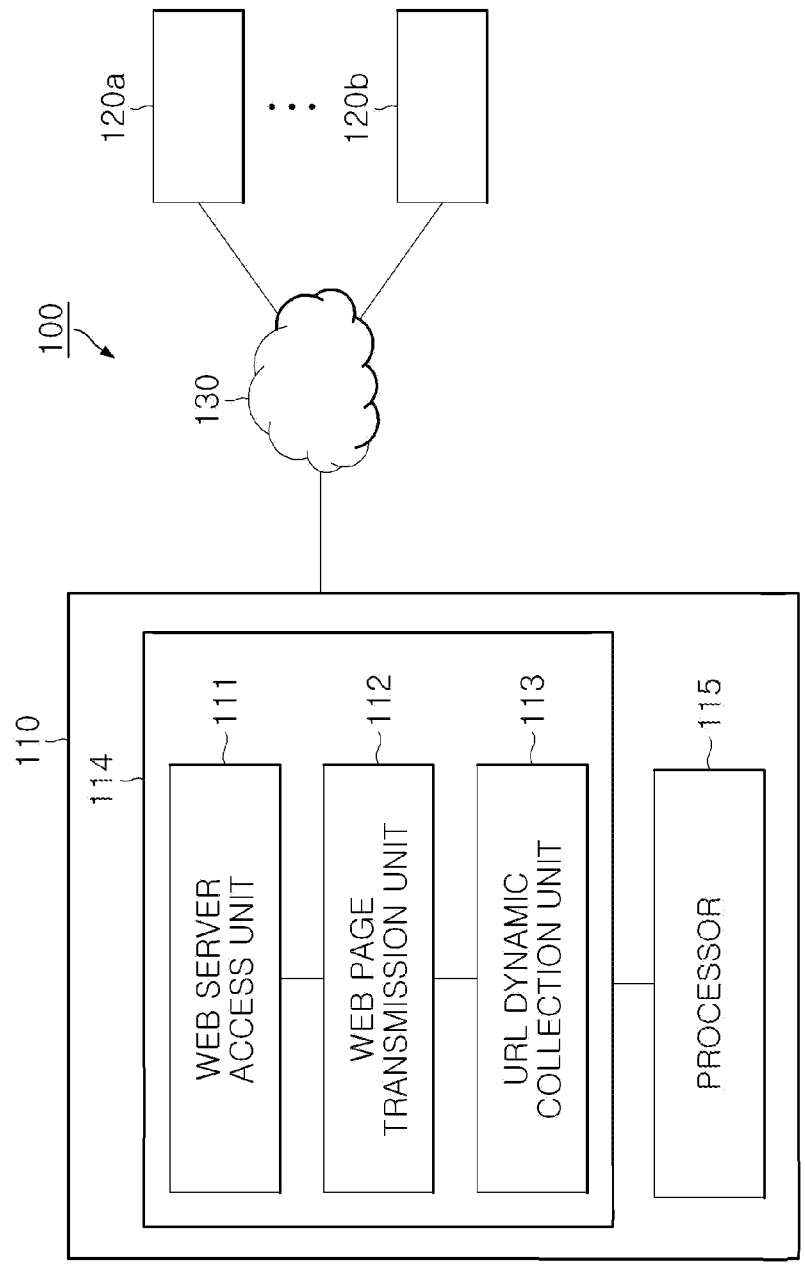
FIG. 8 is a configuration diagram of a URL collecting apparatus according to an exemplary embodiment of the present invention.

FIG. 8 is a configuration diagram of a URL collecting apparatus 110 according to an exemplary embodiment of the present invention.

As illustrated in FIG. 8, the URL collecting apparatus 110 according to an exemplary embodiment of the present invention may be configured to include a web server access unit 111, a web page transmission unit 112, and a URL dynamic collection unit 113.

The URL collecting apparatus 110 according to an exemplary embodiment of the present invention may include physical components including a processor 115, a memory 114, and the like, and the memory 114 may include one or more functional modules or units configured to be executed by the processor 115. Specifically, one or more modules or units may include the web server access unit 111, the web page transmission unit 112, and the URL dynamic collection unit 113, which may be in the form of a software program, computer codes, instructions, etc.

The processor 115 may perform various functions and perform a function of processing data by executing various software programs, computer codes and a set of commands stored in the memory 114, including those corresponding to the web server access unit 111, the web page transmission unit 112, and the URL dynamic collection unit 113. A peripheral interface unit (not shown) may connect an input/output peripheral device of the URL collecting apparatus 110 to the processor 115 and the memory 114, and when a component of the processor 115 or the the URL collecting apparatus 110 accesses the memory 114, a memory controller may perform a function of controlling the access to the memory 1154. In some exemplary embodiments, the processor 115, the memory controller, and the peripheral interface unit may be implemented on a single chip or implemented as separate chips.

The memory 114 may include a high-speed random access memory, one or more magnetic disk storage devices, a non-volatile memory such as a flash memory device, and the like. Further, the memory 114 may further include a storage device located away from the processor 115 or a network attached storage device accessed through a communication network such as the Internet.

Hereinafter, the URL collecting apparatus 110 according to an exemplary embodiment of the present invention will be described separately for each component. More detailed contents for the URL collecting apparatus 110 according to an exemplary embodiment of the present invention may be induced from a description of the URL collecting method according to an exemplary embodiment of the present invention described above, and a more detailed description is omitted below.

First, the web server access unit 111, through the processor 115, accesses the web server 120 of the first URL.

The web page transmission unit 112, through the processor 115, receives the first web page from the web server 120.

Last, the URL dynamic collection unit 113, through the processor 115, collects one or more URLs invoked while performing some or all of the source codes of the first web page.

In this case, the URL dynamic collection unit 113 may collect URLs of invoked resources while rendering the first web page.

The URL dynamic collection unit 113 calculates a tag in which the event is performed in the source code of the first web page and then performs the event of the tag to collect the invoked URL.

The URL dynamic collection unit 113 calculates an attribute in which the event is performed in the source code of the first web page and then performs the event of the attribute to collect the invoked URL.

The URL dynamic collection unit 113 may collect the URL invoked while selecting and performing some codes to invoke the URL among the source codes of the first web page.

The URL dynamic collection unit 113 may collect the URL invoked while the script is executed among the source codes of the first web page.

In this case, the URL dynamic collection unit 113 may perform the source code of the first web page and interrupt some or all of data to be transmitted to the web server 120 by performing the source code.

URL dynamic collection unit 113 may verify whether the first URL is a valid URL which is allowed to be accessed before accessing the web server 120.

As a result, according to an exemplary embodiment of the present invention, in a method, an apparatus and a computer program for collecting a URL, even an invoked URL is collected while performing a source code of a web page in addition to collecting a URL exposed to the source code by parsing the source code of the web page to more effectively collect the URL from the web page.

The above description illustrates the technical spirit of the present invention and various changes and modifications can be made by those skilled in the art to which the present invention pertains without departing from an essential characteristic of the present invention. Accordingly, the exemplary embodiments disclosed in the present invention are not intended to limit the technical spirit of the present invention but describe the technical spirit of the present invention and the present invention is not limited to the exemplary embodiments. The protection scope of the present invention should be construed based on the following appended claims and it should be appreciated that the technical spirit included within the scope equivalent to the claims belongs to the scope of the present invention.

What is claimed is:

1. A URL collecting method performed by a URL collecting apparatus having a processor, comprising:
   accessing a web server of a first URL through a communication network;
   receiving a first web page from the web server;
   a URL dynamic collecting step of performing some or all of source codes of the first web page including executing a script and rendering the first web page, and collecting URLs invoked while executing the script in the first web page; and
   a URL static collecting step of collecting one or more URLs exposed to the source code by parsing the source code of the first web page while rendering the first web page,
   wherein the URLs collected in the URL dynamic collecting step and the URLs collected in the URL static collecting step are added to URLs to be visited, and
   wherein in the URL dynamic collecting step, some or all of data transmitted to the web server while performing the script in rendering the first web page are interrupted by performing a log out request of the URL collecting apparatus from the web server, from which the first web page is received through the communication network, when the data transmitted to the web server in rendering the first web page interferes with the collection of the URLs during the execution of the script, so that the URLs are collected while the URL collecting apparatus is logged out from the web server.

2. The URL collecting method of claim 1, wherein the URL dynamic collecting step includes
   an event tag calculating step of calculating a tag in which an event is performed in the source code of the first web page, and
   an event tag URL collecting step of collecting the URL invoked by performing the event of the tag.

3. The URL collecting method of claim 2, wherein in the event tag URL collecting step, when an <A> tag exists in the source code of the first web page, the URL invoked by incurring a click event of the <A> tag is collected.

4. The URL collecting method of claim 1, further comprising:
   a FORM tag URL collecting step of collecting, when a <FORM> tag exists in the source code of the first web page, parameter information together with a URL included in an "action" attribute of the <FORM> tag.

5. The URL collecting method of claim 1, wherein the URL dynamic collecting step includes
   an event attribute calculating step of calculating an attribute in which an event is performed in the source code of the first web page, and
   an event attribute URL collecting step of collecting the URL invoked by performing the event of the attribute.

6. The URL collecting method of claim 5, wherein in the event attribute URL collecting step, when an "on event" exists in the source code of the first web page, the URL invoked by incurring the "on event" is collected.

7. The URL collecting method of claim 1, further comprising:
   a URL verifying step of verifying whether the first URL is a valid URL which is allowed to be accessed before accessing the web server.

8. The URL collecting method of claim 1, further comprising:
   a duplicated URL removing step of removing a duplicated URL by comparing the URL collected in the URL dynamic collecting step and the URL collected in the URL static collecting step.

9. A non-transitory computer-readable recording medium storing a computer program for executing the steps of the URL collecting method described in claim 1 by a processor.

10. A URL collecting apparatus comprising:
    a memory for storing a plurality of functional units; and
    a processor in communication with the memory for executing the functional units stored in the memory, the functional units including
    a web server access unit for accessing a web server of a first URL through a communication network;
    a web page transmission unit for receiving a first web page from the web server; and
    a URL dynamic collection unit for performing some or all of source codes of the first web pages including executing a script and rendering the first web page, extracting an event tag or an event attribute in the some or all of source codes while executing the script in the first web pages; and
    a URL static collecting unit for collecting one or more URLs exposed to the source code by parsing the source code of the first web page while rendering the first web page,
    wherein the URLs collected in the URL dynamic collecting unit and the URLs collected in the URL static collecting unit are added to URLs to be visited, and
    wherein in the URL dynamic collecting step, some or all of data to be transmitted to the web server while performing the script in rendering the first web page are interrupted by performing a log out request of the URL collecting apparatus from the web server, from which the first web page is received through the communication network when the data transmitted to the web server in rendering the first web page interferes with the collection of the URLs during the execution of the script, so that the URLs are collected while the URL collecting apparatus is logged out from the web server.

* * * * *